United States Patent
Sugaya et al.

(10) Patent No.: US 7,145,718 B2
(45) Date of Patent: Dec. 5, 2006

(54) CONTROL METHOD OF OPTICAL FIBER AMPLIFIER AND OPTICAL TRANSMISSION SYSTEM

(75) Inventors: Yasushi Sugaya, Kawasaki (JP); Shinichirou Muro, Kawasaki (JP); Etsuko Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 148 days.

(21) Appl. No.: 10/929,539

(22) Filed: Aug. 31, 2004

(65) Prior Publication Data
US 2005/0225843 A1 Oct. 13, 2005

(30) Foreign Application Priority Data
Apr. 13, 2004 (JP) ............................. 2004-118096

(51) Int. Cl.
*H01S 3/00* (2006.01)
(52) U.S. Cl. ................................. 359/341.41; 359/334
(58) Field of Classification Search ........... 359/341.41, 359/334
See application file for complete search history.

(56) References Cited

U.S. PATENT DOCUMENTS 5,959,750 A * 9/1999 Eskildsen et al. ............. 398/92
6,310,716 B1 * 10/2001 Evans et al. ................. 359/334

(Continued)

FOREIGN PATENT DOCUMENTS

| JP | 10-073852 | 3/1998 |
|---|---|---|
| JP | 2000-98433 | 4/2000 |
| JP | 2002-76482 | 3/2002 |
| JP | 2002-303896 | 10/2002 |

OTHER PUBLICATIONS

Takeda, et al., "Active Gain-Tilt Equalization by Preferentially 1.43μ m- or 1.48μ m Pumped Raman Amplification, Technical Digest, Optical Amplifiers and Their Application", Nara, Japan, ThA3-1, pp. 76-79, Jun. 9-11, 1999.

(Continued)

*Primary Examiner*—Deandra M. Hughes
(74) *Attorney, Agent, or Firm*—Staas & Halsey LLP

(57) ABSTRACT

In one of control methods of a bidirectional pumping type Raman amplifier according to the present invention, the power of a pumping light supplied to a rare-earth element doped optical fiber is increased or decreased, and a transmission wavelength characteristic of a dynamic gain equalizer is controlled according to a change in a gain wavelength characteristic occurring due to the increase or decrease of the power of the pumping light, to thereby extend a signal light band to either a short wavelength side or a long wavelength side. As a result, it becomes possible to realize a signal light band extension service at a low cost. Moreover, in another control method of the present invention, in a condition where the supply of backward pumping light to the transmission path fiber is shut off, a ratio of a change in the output power of the signal light to a change in the power of the forward pumping light is obtained, and the forward pumping light power is optimized in accordance with this ratio, to obtain a desired level diagram irrespective of a lump loss on the transmission path fiber.

12 Claims, 10 Drawing Sheets

U.S. PATENT DOCUMENTS

| | | | |
|---|---|---|---|
| 6,388,806 B1 * | 5/2002 | Freeman et al. | 359/341.3 |
| 6,587,260 B1 | 7/2003 | Kikuchi et al. | 359/334 |
| 6,665,114 B1 * | 12/2003 | Benjamin et al. | 359/334 |
| 6,882,468 B1 * | 4/2005 | Emori et al. | 359/334 |
| 2003/0058524 A1 | 3/2003 | Akasaka et al. | 359/334 |
| 2003/0095323 A1 | 5/2003 | Onaka et al. | 359/334 |

OTHER PUBLICATIONS

Fludger, et al, "Pump to Signal RIN Transfer in Raman Fiber Amplifiers", Journal of Lightwave Technology, vol. 19, No. 8, pp. 1140-1148, Aug. 2001.

Zhang, et al., "Dependence of Raman Polarization Dependent Gain on Pump Degree of Polarization at High Gain Levels", OMB4-1, OAA 2001.

Bromage, et al., "Raman-enhanced pump signal four-wave mixing in bidirectionally-pumped Raman amplifiers", OWA5, OAA 2002.

* cited by examiner

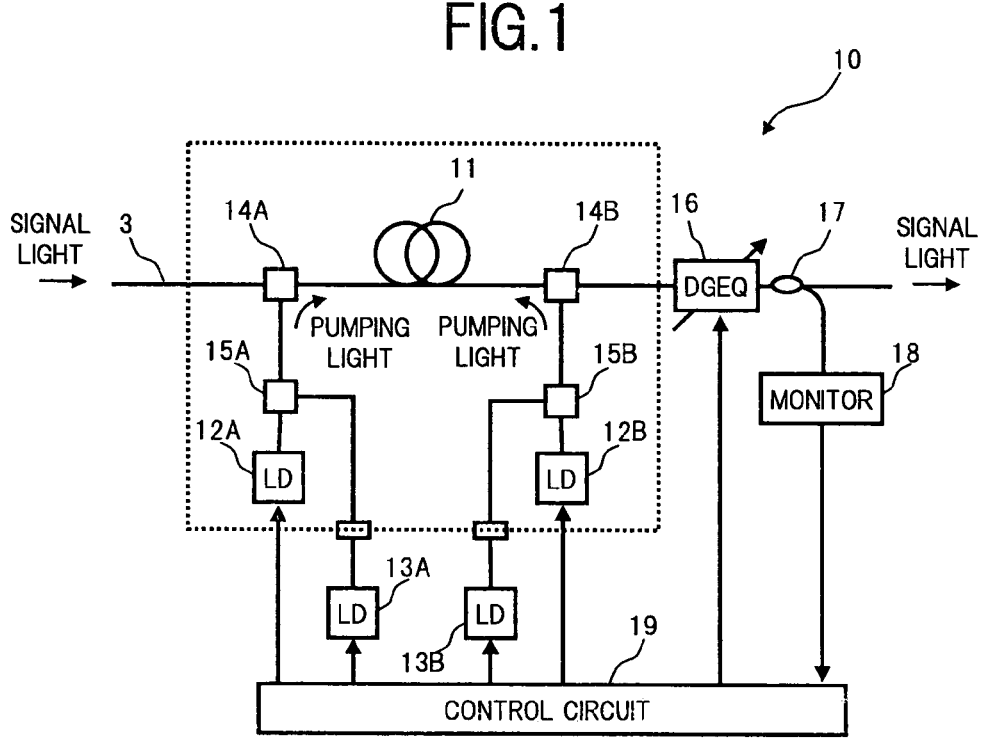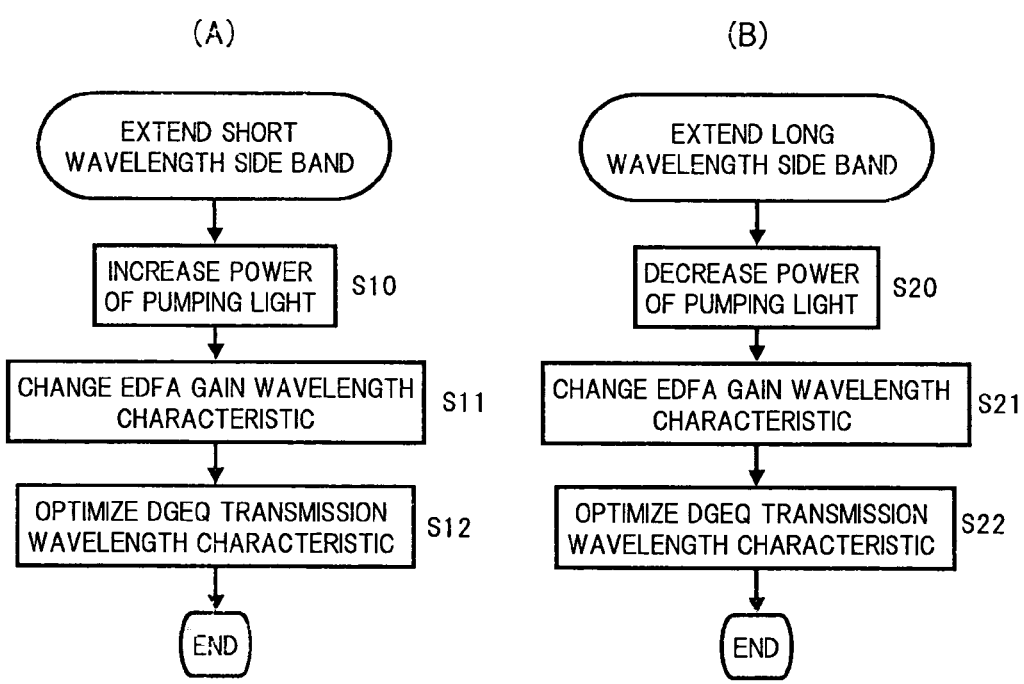

CONTROL METHOD OF OPTICAL FIBER AMPLIFIER AND OPTICAL TRANSMISSION SYSTEM

BACKGROUND OF THE INVENTION (1) Field of the Invention

The present invention relates to a technology for controlling an optical fiber amplifier used in an optical transmission system applied with a wavelength division multiplexing (hereafter referred to as WDM) transmission technology, and in particular, relates to a control method of a pumping light in a rare-earth element doped optical fiber amplifiers or a Raman amplifier, and to an optical transmission system using this method.

(2) Description of the Related Art

Recently, the construction of optical transmission systems or photonic networks, which realize high-capacity optical communications by applying a WDM transmission technology, has become in practical use. In such optical transmission systems, it is possible to collectively amplify a WDM signal light using for example an optical fiber amplifier, such as a rare-earth element doped optical fiber amplifier, a Raman amplifier or the like, thereby repeatedly transmitting the WDM signal light over a long distance.

For the above described optical transmission systems or the like utilizing the optical fiber amplifier, there are common problems, for example, a demand for extending the WDM signal light wavelength band to increase the transmission capacity, or the improvement of an optical signal-to-noise ratio (OSNR) in each repeating interval to realize a superior transmission characteristic.

As a conventional technology for extending a signal light band, in a system as shown in (A) of FIG. 15 for example, wherein a WDM signal light in a wavelength band of 1530 nm to 1565 nm, generally referred to as a C-band, is repeatedly transmitted on a transmission path fiber 3 from a transmission terminal (Tx) 1 to a reception terminal (Rx) 2 while being amplified by a plurality of repeaters 4 each provided with a rare-earth element doped optical fiber amplifier corresponding to the C-band, there has been known a technology as shown in (B) of FIG. 15, wherein a rare-earth element doped optical fiber amplifier 4L corresponding to a wavelength band of 1565 nm to 1625 nm, generally referred to as an L-band is disposed in parallel with a C-band rare-earth element doped optical fiber amplifier 4C of each repeater 4, to extend the signal light band into both the C-band and the L-band. Further, in a system utilizing for example a Raman amplifier, a technology has also been known wherein Raman pumping light source is added, to give a plurality of pumping lights having different wavelengths to an amplification medium, thereby realizing the extension of the signal light band (refer to Japanese Unexamined Patent Publication No. 10-73852, Japanese Unexamined Patent Publication No. 2000-98433, Japanese Unexamined Patent Publication No. 2002-76482, Japanese Unexamined Patent Publication No. 2002-303896, and the literature by M. Takeda et al., "Active gain-tilt equalization by Preferentially 1.43 μm—or 1.48 μm—Pumped Raman Amplification", ThA3, OMA 1999).

As a conventional technology for improving the OSNR in each repeating interval, in a system wherein a plurality of repeaters each using a rare-earth element doped optical fiber amplifier is arranged on a transmission path fiber, a technology has been known wherein a distributed Raman amplifier (DRA) which uses the transmission path fiber in each repeating interval as an amplification medium, is applied to increase the power of the WDM signal light input to the repeater from the transmission path fiber by the Raman amplification as shown by the dotted line in a level diagram in FIG. 16 for example, thereby improving the OSNR. Generally, the DRA applied to such a system is of a backward pumping type configuration in which a pumping light is given to the transmission path fiber in a direction opposite to a propagation direction of the signal light. Moreover, in order to further improve the OSNR in the above system, a system applied with a forward pumping type Raman amplifier in which a pumping light is given to the transmission path fiber in the same direction as the propagation direction of the signal light, is also under investigation. However, for the forward pumping type Raman amplifier, there have been known a problem of RIN transfer in that a relative intensity noise (RIN) in the pumping light transits into the signal light as the noise, and a problem of PDG (polarization dependent gain) in that a Raman gain significantly depends on a signal light polarization state, (refer to the literature by C. R. S. Fludger et al., "Pump to Signal RIN Transfer in Raman Fiber Amplifier", Journal of Lightwave Technology Vol. 19, No. 8, 2001, and the literature by J. Zhang et al., "Dependence of Raman Polarization Dependent Gain on Pump Degree of Polarization at High Gain Levels", OMB4, OAA 2001). In order to reduce the problems of the above forward pumping type Raman amplifier, the utilization of a bidirectional pumping Raman amplifier applied with both the forward pumping and the backward pumping is in the study (refer to the literature by J. Bromage et al., "Raman-enhanced pump-signal four-wave mixing in bidirectionally-pumped Raman amplifiers" OWA5, OM 2002).

However, the conventional technology for extending the signal light band and the conventional technology for improving the OSNR in each repeating interval, cause the following problems.

That is to say, as shown in FIG. 15, in the system using the rare-earth element doped optical fiber amplifiers, when the rare-earth element doped optical fiber amplifiers corresponding to different bands are added in order to extend the signal light band, repeaters equivalent to those prior to the addition are added in parallel. Therefore, there is caused a problem of high cost in band extension service for when transmission capacity demands are increased after the installation of system for example. Further, also when the extension of signal light band is realized by adding the pumping light sources in a system using Raman amplifiers, high-power pumping light sources are generally expensive, resulting in an increase in band extension service cost. In order to provide the band extension service at a minimum cost, it is desirable to be able to readily extend an amplification band of the rare-earth element doped optical fiber amplifier used in a large number of optical transmission systems.

Moreover, when the above bidirectional pumping type Raman amplifier is utilized to improve the OSNR, there is caused a problem in that the performance of the Raman amplifier is considerably varied depending on a position of lump loss existing on the transmission path fiber being the amplification medium. Specifically, this lump loss is a comparatively large loss, which occurs in a concentrated manner due to the bad connection of a connector or a fused portion connecting between transmission path fibers, the bending of fiber or the like.

For example, when the comparison is made on the case where 1 dB lump loss exists on an input end of a signal light and the case where 1 dB lump loss exists on an output end of the signal light, in a 100 km transmission path fiber, as shown in FIG. 17, a signal light level diagram differs considerably between the two cases. Therefore, when the lump loss exists on the input end, the level diagram is lowered over the entire repeating interval, to deteriorate the OSNR. On the other hand, when the lump loss exists on the output end, there is a possibility that the power of the signal light in the transmission path fiber is increased, and thus various non-linear phenomena occur, to deteriorate the signal waveform.

If a large margin to the lump loss is obtained, considering the deterioration in the performance of the Raman amplifier occurring due to the above lump loss, the cost of the bidirectional pumping type Raman amplifier is increased. It is therefore desirable to suppress a variation in the performance of the Raman amplifier due to an influence of lump loss as much as possible.

SUMMARY OF THE INVENTION

The present invention has been accomplished in view of the above problems relating to optical fiber amplifier control technology, with one object to provide a control method of a rare-earth element doped optical fiber amplifier, and an optical transmission system, for enabling the realization of an extension service for signal light band at a low cost. Moreover, another object of the present invention is to provide a control method of a bidirectional pumping type Raman amplifier, and an optical transmission system, which can obtain stable performance irrespective of lump loss on a transmission path fiber.

In order to achieve the above objects, according to a first aspect of the invention, a control method of an optical fiber amplifier which supplies a pumping light to a rare-earth element doped optical fiber, and amplifies a signal light being propagated through the rare-earth element doped optical fiber, comprises; adjusting the power of the pumping light supplied to the rare-earth element doped optical fiber, and also controlling a transmission wavelength characteristic of a dynamic gain equalizer which equalizes a wavelength deviation in the output power occurring in the signal light propagated through the rare-earth element doped optical fiber to be amplified, according to a change in a gain wavelength characteristic occurring due to the power adjustment of the pumping light, to thereby extend a signal light band, which is able to be amplified by the rare-earth element doped optical fiber, to either a short wavelength side or a long wavelength side.

According to this control method, since the power of the pumping light supplied to the amplification fiber is adjusted, and the dynamic gain equalizer is controlled according to the change in the gain wavelength characteristic occurring due to the adjustment, it becomes possible to extend the signal light band to either the short wavelength side or the long wavelength side without adding the optical fiber amplifier for different band.

Further, the above control method may be constituted such that the pumping light is supplied to a transmission path fiber connected to a signal light input side of the rare-earth element doped optical fiber, to thereby amplify the signal light being propagated through the transmission path fiber by Raman effect, and a number of wavelength of the pumping light supplied to the transmission path fiber is increased corresponding to the extension of the signal light band which is able to be amplified by the rare-earth element doped optical fiber.

According to such a control method, the Raman amplifier using the transmission path fiber as an amplification medium is incorporated, to simultaneously control the pumping light for Raman amplification corresponding to the extension of the signal light band. As a result, since the level of the signal light input to a latter staged rare-earth element doped optical fiber rises to be higher due to Raman amplification, it becomes possible to extend the signal light band and also to improve a noise characteristic of the optical fiber amplifier.

According to one mode of a second aspect of the present invention, a control method of an optical fiber amplifier which supplies a forward pumping light and a backward pumping light to a transmission path fiber, and amplifies a signal light being propagated through the bidirectionally pumped transmission path fiber by Raman effect, comprises: at first inputting the signal light to the transmission path fiber, and also changing the power of the forward pumping light supplied to the transmission path fiber within a previously set range, in a condition where the supply of backward pumping light to the transmission path fiber is shut off, to measure the output power of the signal light propagated through the forwardly pumped transmission path fiber to be amplified by Raman effect corresponding to the power of the forward pumping light; next obtaining a ratio of change in the output power of the signal light to a change in the power of the forward pumping light based on the measurement result of the output power of the signal light, to calculate, based on the obtained ratio, the forward pumping light power necessary to realize a previously set target value of the output power of the signal light related to the forwardly pumped transmission path fiber; and then controlling, in accordance with the calculation result, the power of the forward pumping light supplied to the transmission path fiber at the system operation time, and also controlling the power of the backward pumping light according to the power of this forward pumping light.

According to such a control method, the ratio of change in the output power of the signal light to the change in the power of the forward pumping light is obtained in the condition where the supply of backward pumping light is shut off, and the power of the forward pumping light is optimized in accordance with this ratio. Therefore, even when a lump loss exists on the transmission path fiber, a level diagram approximately equivalent to that for when the lump loss does not exist is realized.

Moreover, according to another mode of the second aspect of the present invention, a control method of an optical fiber amplifier which supplies a forward pumping light and a backward pumping light to a transmission path fiber, and amplifies a signal light being propagated through the bidirectionally pumped transmission path fiber to output the signal light, comprises: at first inputting the signal light to the transmission path fiber, and also supplying at least the backward pumping light to the transmission path fiber, to measure the output power of the signal light propagated through the transmission path fiber to be amplified by Raman effect; next obtaining a signal-to-noise ratio of the signal light propagated through the transmission path fiber at the time when the measured output power of the signal light reaches a previously set target value of the signal light output power related to the bidirectionally pumped transmission path fiber, and then, when the signal-to-noise ratio is less than a predetermined value, increasing the power of the forward pumping light while adjusting the power of the backward pumping light so that the output power of the signal light is fixed approximately at the target value, and judging the power of the forward pumping light and the power of the backward pumping light at the time when the signal-to-noise ratio of the signal light propagated through the transmission path fiber reaches the predetermined value, to control, in accordance with the judgment result, each power of the forward pumping light and the backward pumping light supplied to the transmission path fiber at the system operation time.

According to such a control method, since the power of the forward pumping light and the power of the backward pumping light are optimized based on the signal-to-noise ratio of the signal light amplified by Raman effect, then even when the lump loss exists on the transmission path fiber, a level diagram approximately equivalent to that for when the lump loss does not exist is realized.

Other objects, features, and advantages of the present invention will become apparent from the following description of the embodiments, in conjunction with the appended drawings.

BRIEF DESCRIPTION OF THE DRAWINGS

FIG. 1 is a block diagram showing a configuration of main components of one embodiment of an optical transmission system applied with a control method of an optical fiber amplifier according to a first aspect of the present invention.

FIG. 2 is a flowchart for explaining an operation of the optical transmission system of FIG. 1.

DETAILED DESCRIPTION OF THE INVENTION

Figure 3:
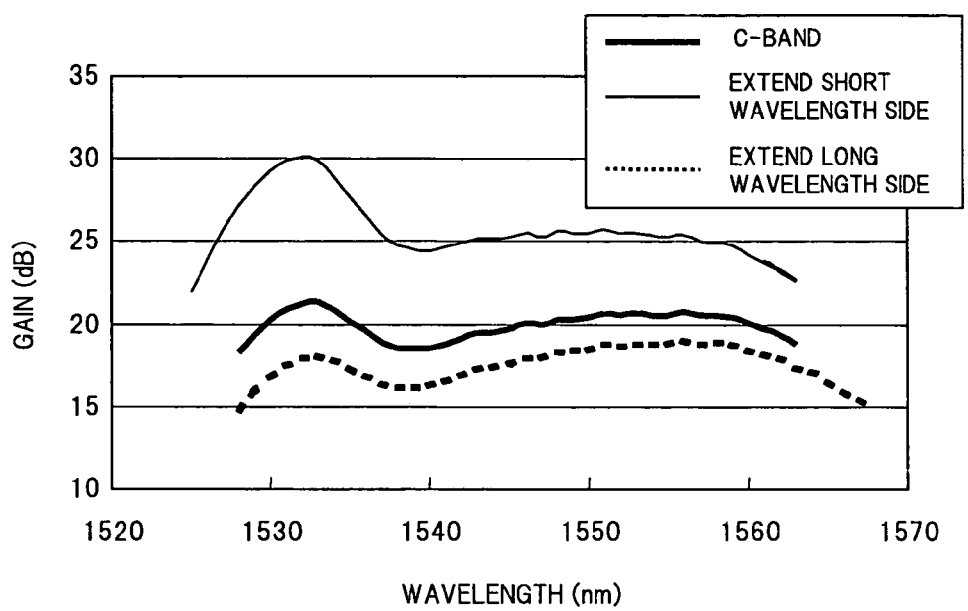
FIG. 3 is a characteristic diagram showing a band extension example centered on a C-band in the optical transmission system in FIG. 1.

Embodiments for carrying out a control method of an optical fiber amplifier according to the present invention will be described, with reference to the appended drawings. The same reference numerals denote the same or equivalent parts throughout all drawings.

FIG. 1 is a block diagram showing a configuration of main components of one embodiment of an optical transmission system applied with a control method of an optical fiber amplifier according to a first aspect of the present invention.

Figure 15:
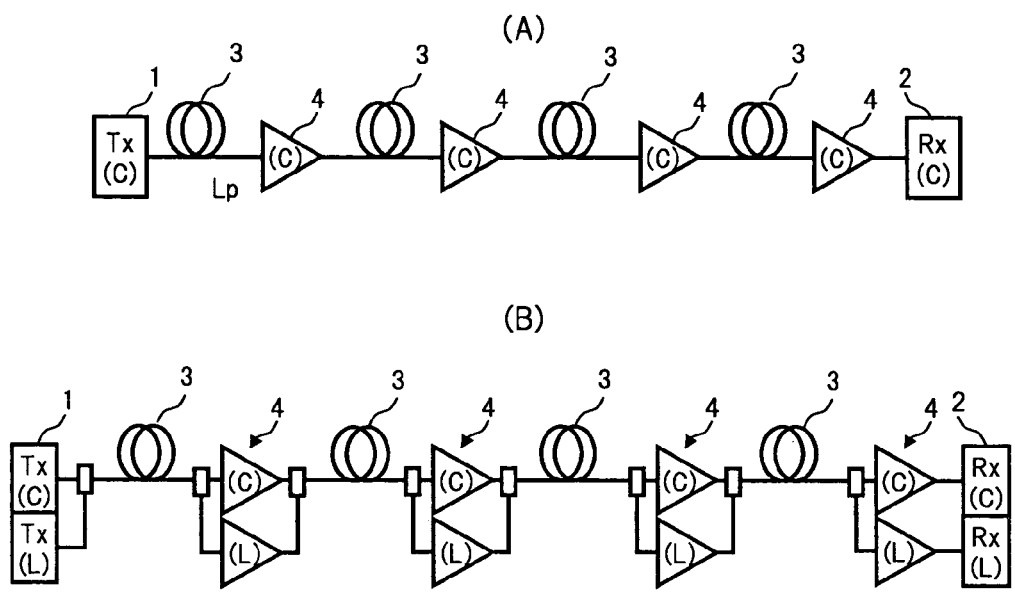
FIG. 15 is a diagram for explaining a conventional technique for extending the signal light band.
Figure 16:
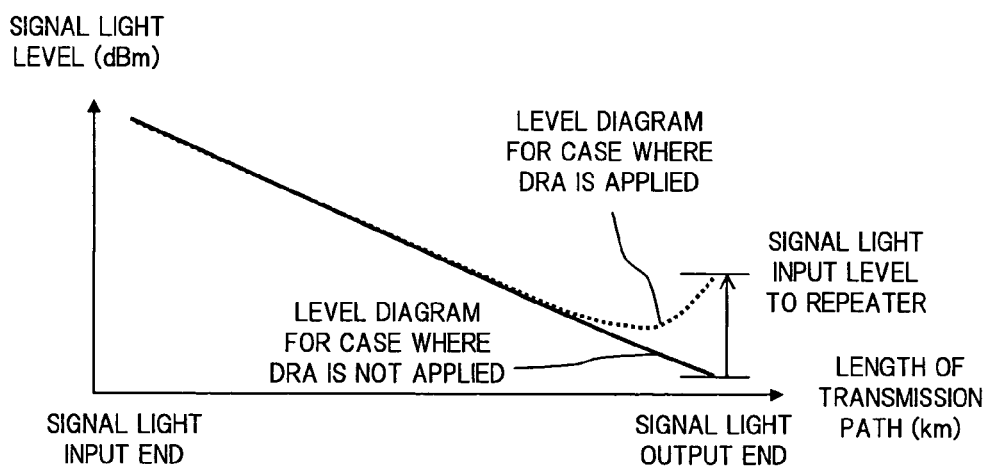
FIG. 16 is a diagram showing an example of a level diagram in a conventional system in which a Raman amplifier is applied for the improvement of an OSNR.
Figure 17:
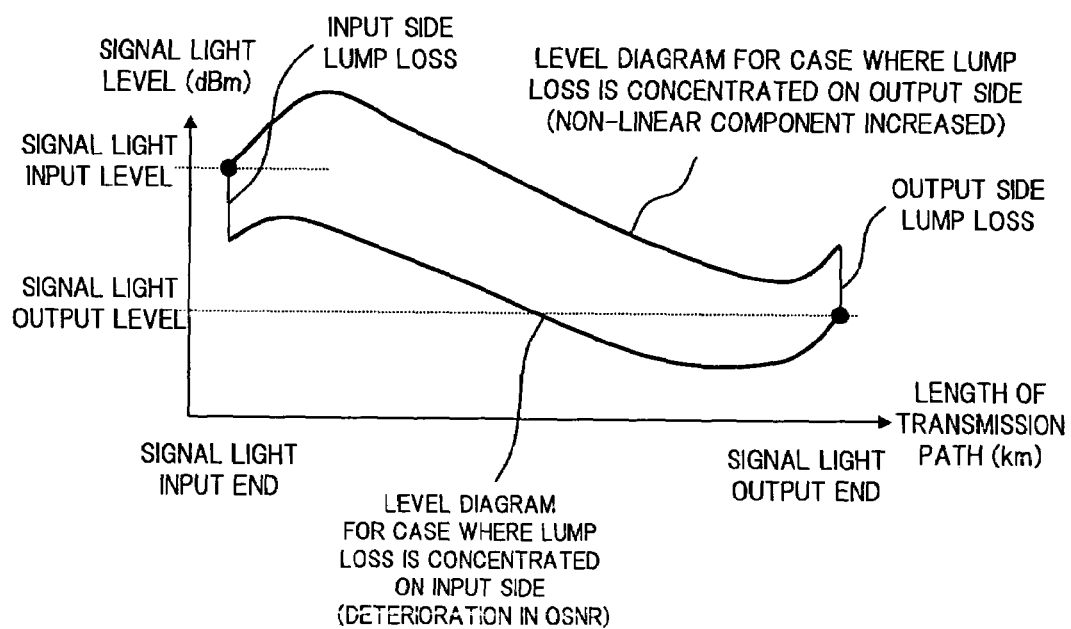
FIG. 17 is a diagram for explaining influences due to a lump loss on a transmission path fiber, in a conventional system in which a bidirectional pumping type Raman amplifier is utilized for improvement of the OSNR.

In FIG. 1, the optical transmission system of the present embodiment comprises an optical amplification repeating section 10 including, for example, an amplification fiber 11, pumping light sources 12A and 12B, additional pumping light sources 13A and 13B, multiplexers 14A, 14B, 15A, and 15B, a dynamic gain equalizer (DGEQ) 16, a photocoupler 17, a monitor 18, and a control circuit 19. The overall configuration of the optical transmission system is similar to the conventional configuration shown in (A) of FIG. 15, and the optical amplification repeating section 10 corresponds to each repeater 4 on a transmission path fiber 3. Moreover, a portion enclosed by the dotted line in the figure is similar to the configuration of the conventional rare-earth element doped optical fiber amplifier.

More specifically, for the amplification fiber 11 constituting the optical amplification repeating section 10, a well-known rare-earth element doped optical fiber having a core doped with a rare-earth element such as erbium or the like, is used.

Each of the pumping light sources 12A and 12B generates a pumping light of a required wavelength band capable to pump the rare-earth element in the amplification fiber 11. For example, in the case where an erbium doped optical fiber (EDF) is used as the amplification fiber 11, the wavelength bands of the pumping light sources 12A and 12B are set to 980 nm band, 1480 nm band or the like.

The additional pumping light sources 13A and 13B are, as described below, pumping light sources added in order to extend a signal light amplification band in the amplification fiber 11 to a short wavelength side, thereby extending a signal light band. The additional pumping light source 13A generates a pumping light having a wavelength slightly different to that of the pumping light source 12A, or a pumping light having the same wavelength as that of the pumping light source 12A with a polarization state different from that of the pumping light source 12A. The additional pumping light source 13B generates a pumping light having a wavelength slightly different to that of the pumping light source 12B, or a pumping light having the same wavelength as that of the pumping light source 12B with a polarization state different from that of the pumping light source 12B.

The multiplexer 14A supplies the pumping light output from the pumping light source 12A to the amplification fiber 11 from a forward direction (signal light input side). The multiplexer 14B supplies the pumping light output from the pumping light source 12B to the amplification fiber 11 from a backward direction (signal light output side). A typical WDM signal light coupler or the like can be used as the multiplexers 14A and 14B. Note, a configuration of bidirectional pumping type is described here. However the present invention is not limited to this, and can be applied to a rare-earth element doped optical fiber amplifiers of forward pumping type configuration or a backward pumping type configuration.

The multiplexer 15A multiplexes the pumping light output from the pumping light source 12A and the pumping light output from the additional pumping light source 13A, to give the multiplexed light to the multiplexer 14A. The multiplexer 15B multiplexes the pumping light output from the pumping light source 12B, and the pumping light output from the additional pumping light source 13B, to give the multiplexed light to the multiplexer 14B. In the case where the wavelength of each of the pumping light sources 12A and 12B is slightly different from the wavelength of each of the additional pumping light sources 13A and 13B, the WDM coupler can be used for each of the multiplexers 15A and 15B. On the other hand, in the case where the wavelength of each of the pumping light sources 12A and 12B is the same as the wavelength of each of the additional pumping light sources 13A and 13B, but the polarization states are different from each other, a polarization combiner can be used.

The dynamic gain equalizer 16 is a well-known optical device, which receives a WDM signal light having been propagated through the amplification fiber 11 supplied with the pumping lights, to be amplified, and can transmit the input light in accordance with a transmission wavelength characteristic controlled according to a control signal from the control circuit 19.

The photocoupler 17 branches a part of the WDM signal light transmitted through the dynamic gain equalizer 16, to send the branched light to the monitor 18. The monitor 18 measures a spectrum of the branched light from the photocoupler 17 by a typical method, and based on the measurement result, monitors a wavelength characteristic of the power of the WDM signal light output from the optical amplification repeating section 10.

The control circuit 19 controls the power of each of the pumping lights supplied to the amplification fiber, and the transmission characteristic of the dynamic gain equalizer 16 by mutually associating them, according to the wavelength band setting for the WDM signal light input to the optical amplification repeating section 10 and the monitor result in the monitor 18.

An operation of the optical transmission system having the above configuration will be described.

In the present optical transmission system, the WDM signal light transmitted from a transmission terminal 1 (FIG. 15) to the transmission path fiber 3 is repeatedly transmitted to a reception terminal 2 while being amplified by the optical amplification repeating sections 10 disposed in plural numbers on the transmission path fiber 3. In each of the optical amplification repeating sections 10, the WDM signal light propagated through the transmission path fiber 3 is sent to the amplification fiber 11 via the multiplexer 14A. The pumping light from the pumping light source 12A and the pumping light from the additional pumping light source 13A are multiplexed by the multiplexer 15A to be supplied to the amplification fiber 11 as a forward pumping light via the multiplexer 14A, and also, the pumping light from the pumping light source 12B and the pumping light from the additional pumping light source 13B are multiplexed by the multiplexer 15B to be supplied to the amplification fiber 11 as a backward pumping light via the multiplexer 14B, so that the rare-earth element (erbium in this case) in the amplification fiber 11 is pumped by these pumping lights.

The power of each of the pumping lights supplied from both directions to the amplification fiber 11 at this time is controlled to a level according to a wavelength band of the WDM signal light, as a result that a pumping state of each of the pumping light sources 12A and 12B or each of the additional pumping light sources 13A and 13B, is adjusted in accordance with the control signal output from the control circuit 19, as described below. Details of the control of the power of the pumping light by the control circuit 19 will be described later.

The WDM signal light being propagated through the amplification fiber 11 supplied with the pumping lights is amplified due to a stimulated emission effect of the erbium, and the amplified WDM signal light is given to the dynamic gain equalizer 16 via the multiplexer 14B. In the dynamic gain equalizer 16, the gain equalization on the WDM signal light is performed in accordance with the transmission characteristic controlled by the control signal from the control circuit 19. Note, gain equalization means that the optical power corresponding to each wavelength of the WDM signal light adjusted to match or approach a required level. Then, the WDM signal light transmitted through the dynamic gain equalizer 16 is sent to the transmission path fiber 3 in the next repeating interval, and a part thereof is branched by the photocoupler 17 and given to the monitor 18, in which the wavelength characteristic of the output light power is monitored.

Here, the control of the additional pumping light sources 13A and 13B and the dynamic gain equalizer 16 by the control circuit 19 will be described in detail, referring to the flowchart in FIG. 2.

For example, assuming the case where transmission capacity demands are increased after the installation of the present optical transmission system, and it is required to extend the signal light wavelength band to the short wavelength side or a long wavelength side, then the control circuit 19 controls the power of each of the pumping lights supplied to the amplification fiber 11, and the transmission characteristic of the dynamic gain equalizer 16 by mutually associating them, in accordance with the algorithm for band extension to the short wavelength side as exemplified in (A) of FIG. 2, or in accordance with the algorithm for band expansion to the long wavelength side as exemplified in (B) of FIG. 2.

More specifically, in the case where the wavelength band of the signal light is extended to the short wavelength side, at first in step 10 in (A) of FIG. 2 (indicated by S10 in the flowchart, with similar notations hereunder), the control signal for increasing the pumping light power supplied to the amplification fiber 11 is generated by the control circuit 19, to be output to each of the additional pumping light sources 13A and 13B.

Figure 4:
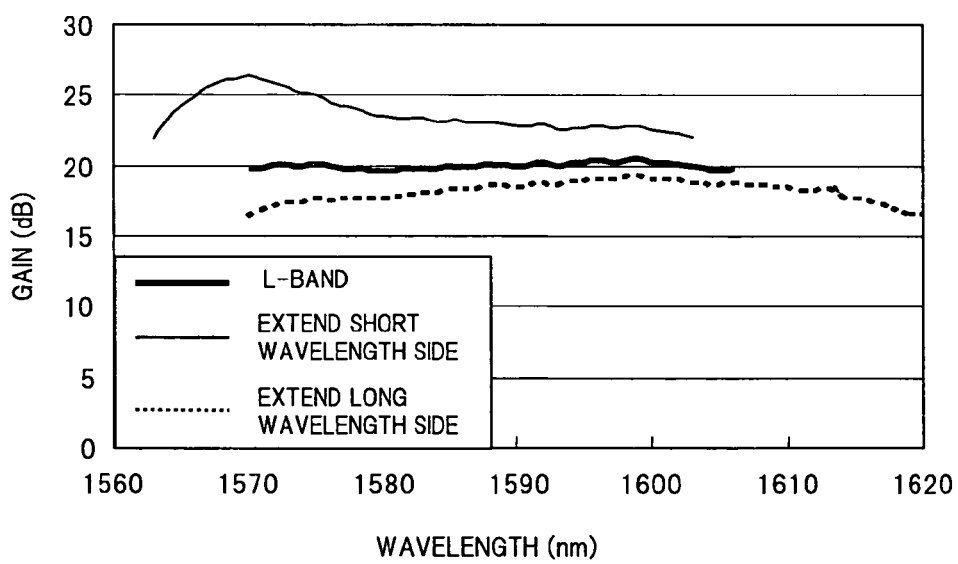
FIG. 4 is a characteristic diagram showing a band extension example centered on an L-band in the optical transmission system in FIG. 1.

In step 11, drive states of the additional pumping light sources 13A and 13B are controlled in accordance with the control signals from the control circuit 19, and the power of each of the pumping lights output from the additional pumping light sources 13A and 13B is adjusted to reach a required level. As a result, as shown in a band extension example centered on a C-band in FIG. 3 and a band extension example centered on an L-band in FIG. 4, a gain wavelength characteristic of optical amplification generated in the amplification fiber 11 using the EDF has a characteristic in which the wavelength band generating an effective gain extends to the short wavelength side (thin line), compared to a characteristic prior to band extension (thick line) in which the pumping light power is set to be in a condition similar to the conventional condition. Furthermore, the whole level of the gain wavelength characteristic rises with the increase of the pumping light power, and also, a change occurs in a shape of the gain wavelength characteristic. The increase of gain and the change in the wavelength shape due to the increase of the pumping light power are absorbed, by optimizing the transmission wavelength characteristic of the dynamic gain equalizer 16 in the next step 12.

More specifically, in step 12, the control signal for optimizing the transmission wavelength characteristic of the dynamic gain equalizer 16 corresponding to the increase of the pumping light power, is generated by the control circuit 19, to be output to the dynamic gain equalizer 16. In the dynamic gain equalizer 16, the transmission wavelength characteristic is dynamically controlled in accordance with the control signal from the control circuit 19, and the gain equalization and level adjustment of the WDM signal light output from the amplification fiber 11 is performed. Moreover, here, the wavelength characteristic of the WDM signal light gain equalized in the dynamic gain equalizer 16 is monitored by the photocoupler 17 and the monitor 18, and the monitor result is fed back to the control circuit 19, to be reflected in the optimization control of the dynamic gain equalizer 16.

On the other hand, in the case where the wavelength band of the signal light is extended to the long wavelength side, in step 20 in (B) of FIG. 2, the control signal for decreasing the pumping light power to be supplied to the amplification fiber 11 is generated by the control circuit 19, to be output to each of the pumping light sources 12A and 12B.

In step 21, drive states of the pumping light sources 12A and 12B are controlled in accordance with the control signals from the control circuit 19, and the power of each of the pumping lights output from the pumping light sources 12A and 12B is adjusted to reach a required level. As a result, as shown in the band extension examples in FIG. 3 and FIG. 4, the gain wavelength characteristic of optical amplification generated in the amplification fiber 11 has a characteristic in which the wavelength band generating an effective gain extends to the long wavelength side (dotted line), compared to a characteristic prior to band extension (bold line) in which the pumping light power is set to be in a condition similar to the conventional condition. Furthermore, the whole level of the gain wavelength characteristic is lowered with the decrease of pumping light power, and also, a change occurs in the shape of the gain wavelength characteristic.

In the next step 22, the control signal for optimizing the transmission wavelength characteristic of the dynamic gain equalizer 16 corresponding to the decrease of the pumping light power, is generated by the control circuit 19, and, as in step 12, a feedback control of the dynamic gain equalizer 16 is executed in accordance with the control signal from the control circuit 19.

In the above manner, according to the optical transmission system of the present embodiment, the pumping light power to be supplied to the amplification fiber 11 is increased or decreased, and also the transmission wavelength characteristic of the dynamic gain equalizer 16 is optimized corresponding to the change in the gain wavelength characteristic occurring due to the increase or decrease in the pumping light power, so that the amplification band of the rare-earth element doped optical fiber amplifier can be readily extended to the short wavelength side or the long wavelength side. As a result, differently from the conventional example shown in (B) of FIG. 15, the signal light band can be extended without adding an optical fiber amplifier of different band. Therefore, a band extension service can be provided at a minimum cost when transmission capacity demands are increased after the installation of the system and so on. Moreover, since the extension of the signal light band in the present embodiment can be performed during the existing wavelength operation (in-service), the convenience in terms of system operation is excellent.

In the above embodiment, one example has been shown where the dynamic gain equalizer 16 is arranged on the latter stage of the rare-earth element doped optical fiber amplifier. However, a positional relationship of the rare-earth element doped optical fiber amplifier and dynamic gain equalizer in the present invention is not limited to the above example. For example, the present invention is applicable to an arbitrary configuration assumable to be used as the optical amplification repeating section, such as a configuration in which a dynamic gain equalizer is arranged between stages of a two-staged rare-earth element doped optical fiber amplifier.

Further, the erbium doped optical fiber amplifier has been proposed as one example of the rare-earth element doped optical fiber amplifier. However, also for an optical fiber amplifier doped with rare-earth element other than erbium, it is possible to realize the extension of the signal light band, by increasing or decreasing the pumping light power and the optimization of the dynamic gain equalizer.

Moreover, the wavelength characteristic of the WDM signal light output from the dynamic gain equalizer has been monitored, to feedback control the dynamic gain equalizer. However, the constitution may be such that optimum conditions of the dynamic gain equalizer corresponding to the setting of the pumping light power are previously specified, to be stored in a memory or the like, and then when the extension of the signal light band becomes necessary, the stored data is referred to, to determine an appropriate condition. In this manner, the output monitor can be omitted, and hence a system of lower cost may be provided.

Next is a description of another embodiment of an optical transmission system applied with the control method of the optical fiber amplifier according to the first aspect of the present invention.

Figure 5:
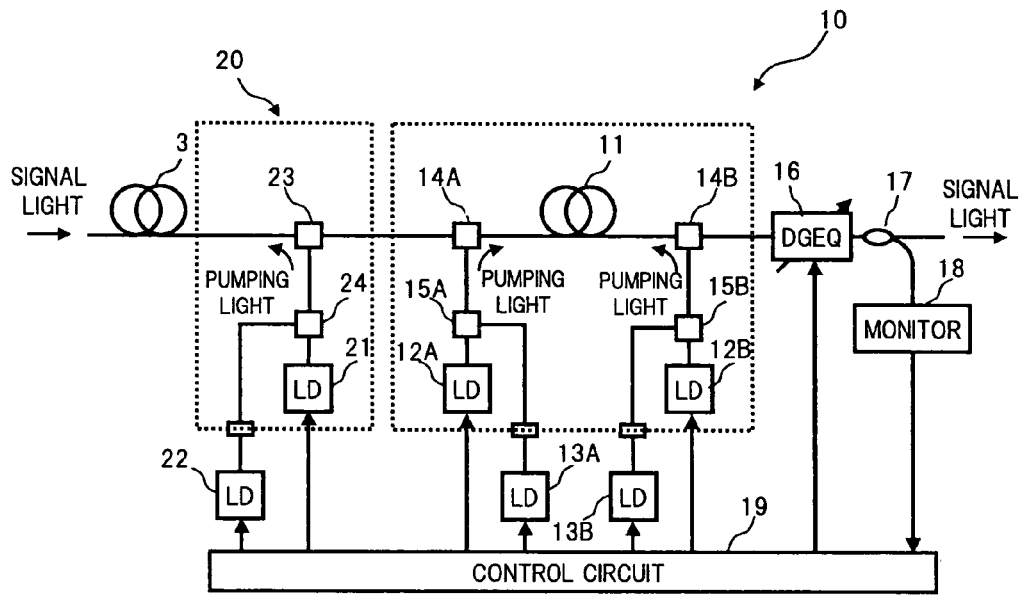
FIG. 5 is a block diagram showing a configuration of main components of another embodiment of an optical transmission system applied with the control method of the optical fiber amplifier according to the first aspect of the present invention.

FIG. 5 is a block diagram showing a configuration of main components of an optical transmission system of the above another embodiment.

In FIG. 5, the optical transmission system of this embodiment is configured so that, in the above optical transmission system shown in FIG. 1, a distributed Raman amplifier 20 using the transmission path fiber 3 as the amplification medium, is incorporated in each of the optical amplification repeating sections 10 to improve a noise characteristic in each repeating interval. The Raman amplifier 20 comprises, for example, a Raman amplification pumping light source 21, an additional Raman amplification pumping light source 22, and multiplexers 23 and 24.

More specifically, the Raman amplification pumping light source 21 generates a pumping light having the required wavelength and power, which are capable to cause the Raman amplification on the WDM signal light being propagated through the transmission path fiber 3. In the Raman amplification, in the case where a silica-type optical fiber, for example, is used as the transmission path fiber 3 (the amplification medium), a gain peak occurs at a frequency lower by 13.2 THz than a frequency of the pumping light. Therefore, a wavelength of the Raman amplification pumping light source 21 is set in a band on the short wavelength side by an approximately 100 nm to the C-band signal light, for example. The output light power of the Raman amplification pumping light source 21 is controlled to a required level in accordance with the control signal from the control circuit 19.

The additional Raman amplification pumping light source 22 is a pumping light source, which is added to extend a Raman amplification band corresponding to the extension of the amplification band in the latter staged rare-earth element doped optical fiber amplifier. A wavelength of the additional Raman amplification pumping light source 22 is set according to the signal light band to be extended, and is set to a value fundamentally different from the wavelength of the Raman amplification pumping light source 21. The output light power of the additional Raman amplification pumping light source 22 is also controlled to a required level in accordance with the control signal from the control circuit 19.

The multiplexer 23 supplies the pumping light output from the Raman amplification pumping light source 21 to the transmission path fiber 3 to the backward (signal light output side). Further, the multiplexer 24 multiplexes the pumping light output from the Raman amplification pumping light source 21 and a pumping light output from the additional Raman amplification pumping light source 22, to give the multiplexed light to the multiplexer 23. As a specific example of the multiplexers 23 and 24, the typical WDM coupler or the like can be used.

In the optical transmission system having the above configuration, the WDM signal light generated in the transmission terminal 1 (see FIG. 15) is transmitted to the transmission path fiber 3. The respective pumping lights from the Raman amplification pumping light source 21 and the additional Raman amplification pumping light source 22 whose drive states are controlled by the control circuit 19, are supplied to the transmission path fiber 3 via the multiplexers 23 and 24, and the Raman amplification pumping lights are propagated through the transmission path fiber 3 in a direction opposite to the propagation direction of the signal light. As a result, the WDM signal light being propagated through the transmission path fiber 3 is amplified by Raman effect to reach the optical amplification repeating section 10.

The WDM signal light amplified by Raman effect in the transmission path fiber 3 is sent to the amplification fiber 11 via the multiplexer 14A in the same manner as in the above embodiment shown in the FIG. 1, to be amplified due to the stimulated emission effect of the erbium or the like which is pumped upon receipt of the supply of the pumping lights from the pumping light sources 12A and 12B and the additional pumping light sources 13A and 13B, whose drive states are controlled by the control circuit 19. The WDM signal light propagated through the amplification fiber 11 to be amplified is given to the dynamic gain equalizer 16 whose transmission wavelength characteristic is controlled in accordance with the control signal light from the control circuit 19, to be gain equalized. Then, the WDM signal light transmitted through the dynamic gain equalizer 16 is sent to the transmission path fiber 3 in the next repeating interval, and a part thereof is branched by the photocoupler 17 and given to the monitor 18, in which the wavelength characteristic of the output light power is monitored.

Here, the control operation of the control circuit 19 in this embodiment will be described in detail, with reference to a flowchart of FIG. 6.

Figure 6:
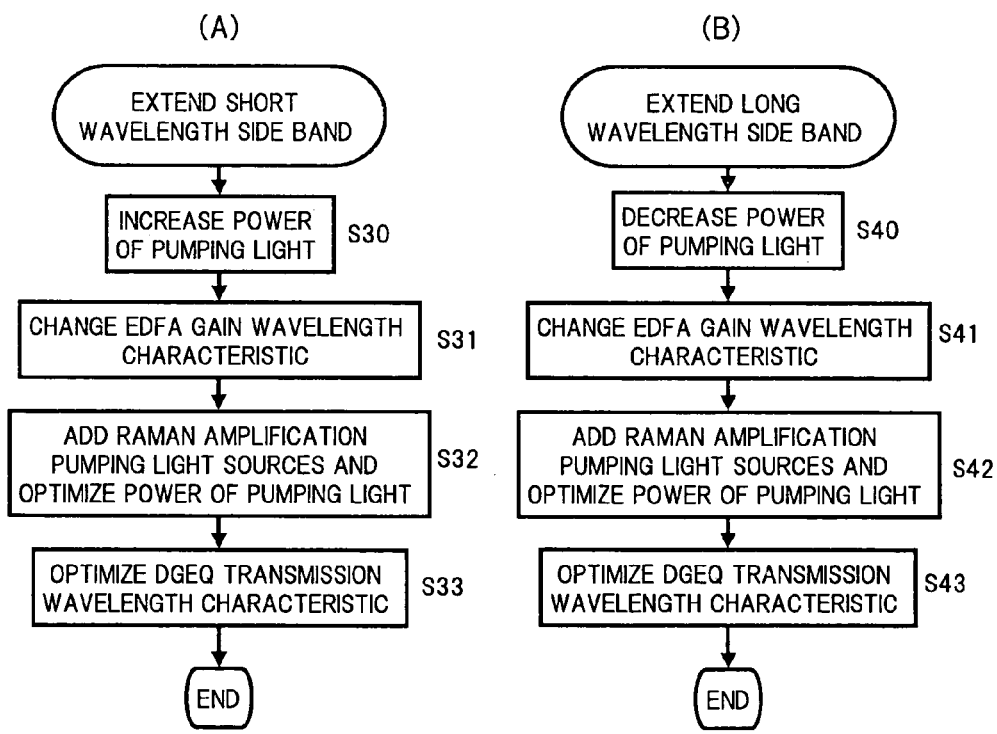
FIG. 6 is a flowchart for explaining an operation of the optical transmission system of FIG. 5.

In the same manner as the above description of operation in reference to FIG. 2, for example, assuming the case where transmission capacity demands are increased after the installation of the present optical transmission system, and it is required to extend the signal light wavelength band to the short wavelength side or the long wavelength side, then the control circuit 19 controls the pumping light power supplied to the transmission path fiber 3, the pumping light power supplied to the amplification fiber 11 and the transmission characteristic of the dynamic gain equalizer 16 by mutually associating them, in accordance with the algorithm for band extension to the short wavelength side as exemplified in (A) of FIG. 6, or in accordance with the algorithm for band expansion to the long wavelength side as exemplified in (B) of FIG. 6.

More specifically, in the case where the wavelength band of the signal light is extended to the short wavelength side, at first in step 30 in (A) of FIG. 6, the control signal for increasing the pumping light power supplied to the amplification fiber 11 is generated by the control circuit 19, to be output to each of the additional pumping light sources 13A and 13B. Then, in step 31, the drive states of the additional pumping light sources 13A and 13B are controlled in accordance with the control signals from the control circuit 19, and the power of each of the pumping lights output from the additional pumping light sources 13A and 13B is adjusted to reach a required level. As a result, the gain wavelength characteristic of the optical amplification in the amplification fiber 11 is extended to the short wavelength side, and also the whole level of the gain rises, so that a change also occurs in the wavelength shape.

Next, in step 32, the wavelength or power of the Raman amplification pumping light supplied to the transmission path fiber 3 is adjusted so that the Raman amplification wavelength band in the transmission path fiber 3 is also extended to the short wavelength side corresponding to the extension of the signal light band to the short wavelength side. Here, for example, the Raman amplification pumping light source 22 having the wavelength shorter than the wavelength of the Raman amplification pumping light source 21 is added, so that the Raman amplification wavelength band is extended to the short wavelength side. The power of the light output from each of the Raman amplification pumping light source 21 and the additional Raman amplification pumping light source 22 is set to an optimum level by being mutually associated with the control of the transmission wavelength characteristic of the dynamic gain equalizer 16 performed in the next step 33, so that the desired gain equalization on the WDM signal light is realized, and also the OSNR of optical signals of respective wavelengths contained in the WDM signal light is most flat. In the optimization of the Raman amplification pumping light power and the transmission wavelength characteristic of the dynamic gain equalizer 16, more specifically, it is preferable to optimize the transmission wavelength characteristic of the dynamic gain equalizer 16, so that a slope is provided so that the power of the Raman amplification pumping light on the short wavelength side is relatively greater than that on the long wavelength side, and the wavelength deviation of a Raman gain occurring according to the slope is flattened by the dynamic gain equalizer 16.

Here, the Raman amplification pumping light source is added to cope with the extension to the short wavelength side of the signal light band. However, for example, in the case where a plurality of pumping light sources having different wavelengths is utilized as the Raman amplification pumping light source 21, it is also possible to extend the Raman amplification wavelength band to the short wavelength side by increasing the output power of the pumping light sources on the short wavelength side among the plurality of pumping light sources.

On the other hand, in the case where the wavelength band of the signal light is extended to the long wavelength side, in step 40 in (B) of FIG. 6, the control signal for decreasing the pumping light power to be supplied to the amplification fiber 11 is generated by the control circuit 19, to be output to each of the pumping light sources 12A and 12B. Then, in step 41, the drive states of the pumping light sources 12A and 12B are controlled in accordance with the control signals from the control circuit 19, and the power of each of the pumping lights output from the pumping light sources 12A and 12B is adjusted to reach a required level. As a result, the gain wavelength characteristic of the optical amplification in the amplification fiber 11 is extended to the long wavelength side, and also the whole level of the gain is lowered, so that a change also occurs in the wavelength shape.

Next, in step 42, the wavelength or power of the Raman amplification pumping light supplied to the transmission path fiber 3 is adjusted so that the Raman amplification wavelength band in the transmission path fiber 3 is also extended to the long wavelength side corresponding to the extension of the signal light band to the long wavelength side. Here, for example, the Raman amplification pumping light source 22 having the wavelength longer than the wavelength of the Raman amplification pumping light source 21 is added, so that the Raman amplification wavelength band is extended to the long wavelength side. The power of the light output from each of the Raman amplification pumping light source 21 and the additional Raman amplification pumping light source 22 is set to an optimum level by being mutually associated with the control of the transmission wavelength characteristic of the dynamic gain equalizer 16 performed in the next step 43, so that the desired gain equalization on the WDM signal light is realized, and also the OSNR of optical signals of respective wavelengths contained in the WDM signal light is most flat. A preferable specific example of the optimization of the Raman amplification pumping light power and the transmission wavelength characteristic of the dynamic gain equalizer 16 is similar to that for extending to the short wavelength side.

In the above manner, according to the optical transmission system of the present embodiment, the same effect can be obtained as with the above embodiment shown in the FIG. 1, and also the Raman amplifier 20 using the transmission path fiber 3 as the amplification medium is incorporated to control simultaneously the Raman amplification pumping light corresponding to the extension of the signal light band, so that the level of the WDM signal light input to the amplification fiber 11 of each optical amplification repeating section 10 rises due to the Raman amplification. Therefore, it becomes possible to improve the OSNR in each repeating interval. Moreover, by increasing or decreasing the power of the pumping light supplied to the amplification fiber 11 in order to extend the signal light band, the gain of the rare-earth element doped optical fiber amplifier is increased or decreased. However, even in the case where the increase or decrease of the gain exceeds the range where the increase or decrease of the gain can be absorbed by the dynamic gain equalizer 16, by controlling the transmission wavelength characteristic of the dynamic gain equalizer 16 in cooperation with the control of the Raman gain in the transmission path fiber 3, the level diagram of entire optical amplifier repeating node including the Raman amplifier 20, can be reset. Therefore, the signal light band can be extended across a wider range.

Next, an optical transmission system applied with a control method of an optical fiber amplifier according to a second aspect of the present invention.

Figure 7:
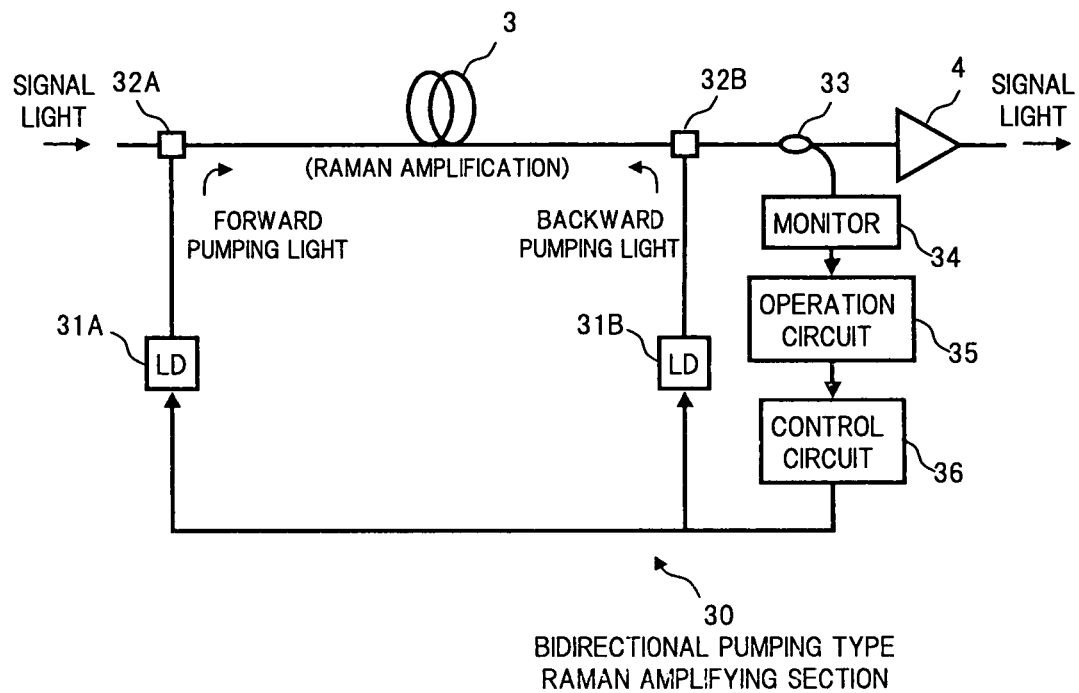
FIG. 7 is a block diagram showing a configuration of main components of one embodiment of an optical transmission system applied with a control method of an optical fiber amplifier according to a second aspect of the present invention.

FIG. 7 is a block diagram showing a configuration of main components of one embodiment of the optical transmission system applied with the control method of an optical fiber amplifier according to the second aspect of the present invention. Further, FIG. 8 is a diagram showing the overall configuration of the optical transmission system.

Figure 8:
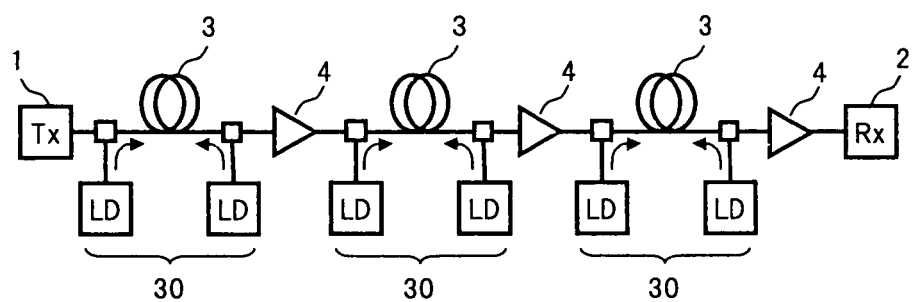
FIG. 8 is a diagram showing the overall configuration of the optical transmission system of FIG. 7.

In the optical transmission system of the present embodiment, for example as shown in FIG. 8, a plurality of repeaters 4 are arranged on the transmission path fiber 3 connecting between the transmission terminal (rx) 1 and the reception terminal (Rx) 2, and also a bidirectional pumping type Raman amplifying section 30, which uses the transmission path fiber 3 between each repeater 4 as the amplification medium to supply pumping lights from both directions, and amplifies the WDM signal light being propagated through the transmission path fiber 3 by Raman effect, is arranged for each repeating interval. The bidirectional pumping type Raman amplifying section 30 in each repeating interval, for example as shown in FIG. 7, includes Raman amplification pumping light sources (LD) 31A and 31B, multiplexers 32A and 32B, a photocoupler 33, a monitor 34, an operation circuit 35, and a control circuit 36. As each repeater 4, there may be used a typical repeater applied to a well-known optical transmission system, or an optical amplification repeating section applied with the first aspect of the present invention as shown in FIG. 1 or FIG. 5.

More specifically, each of the Raman amplification pumping light sources 31 A and 31 B generates a pumping light having the required wavelength and power, which are capable to cause the Raman amplification on the WDM signal light being propagated through the transmission path fiber 3. Here, the pumping light output from each of the Raman amplification pumping light sources 31A and 31B is constituted by a single wavelength.

The multiplexer 32A supplies the pumping light output from the Raman amplification pumping light source 31A to the transmission path fiber 3 from a forward direction (signal light input side). The multiplexer 32B supplies the pumping light output from the Raman amplification pumping light source 31 B to the transmission path fiber 3 from a backward direction (signal light output side). As a specific example of the multiplexers 32A and 32B, the typical WDM coupler or the like can be used.

The photocoupler 33 branches a part of the WDM signal light which is propagated through the transmission path fiber 3 to be input to the repeater 4, and sends the branched light to the monitor 34. The monitor 34 measures the power of the branched light from the photocoupler 33, and monitors the output power of the WDM signal light propagated through the transmission path fiber 3 to be amplified by Raman effect.

The operation circuit 35 calculates a set value of the pumping light power in consideration of an influence by a lump loss existing on the transmission path fiber 3, as described below, based on the monitored value of the signal light output power in the monitor 34, to output a signal indicating the calculation result to the control circuit 36.

The control circuit 36 generates a signal for controlling a drive state of each of the Raman amplification pumping light sources 31A and 31B in accordance with the output signal from the operation circuit 35, to output this control signal to each of the Raman amplification pumping light sources 31A and 31B.

Next, an operation of the optical transmission system having the above configuration will be described.

Figure 9:
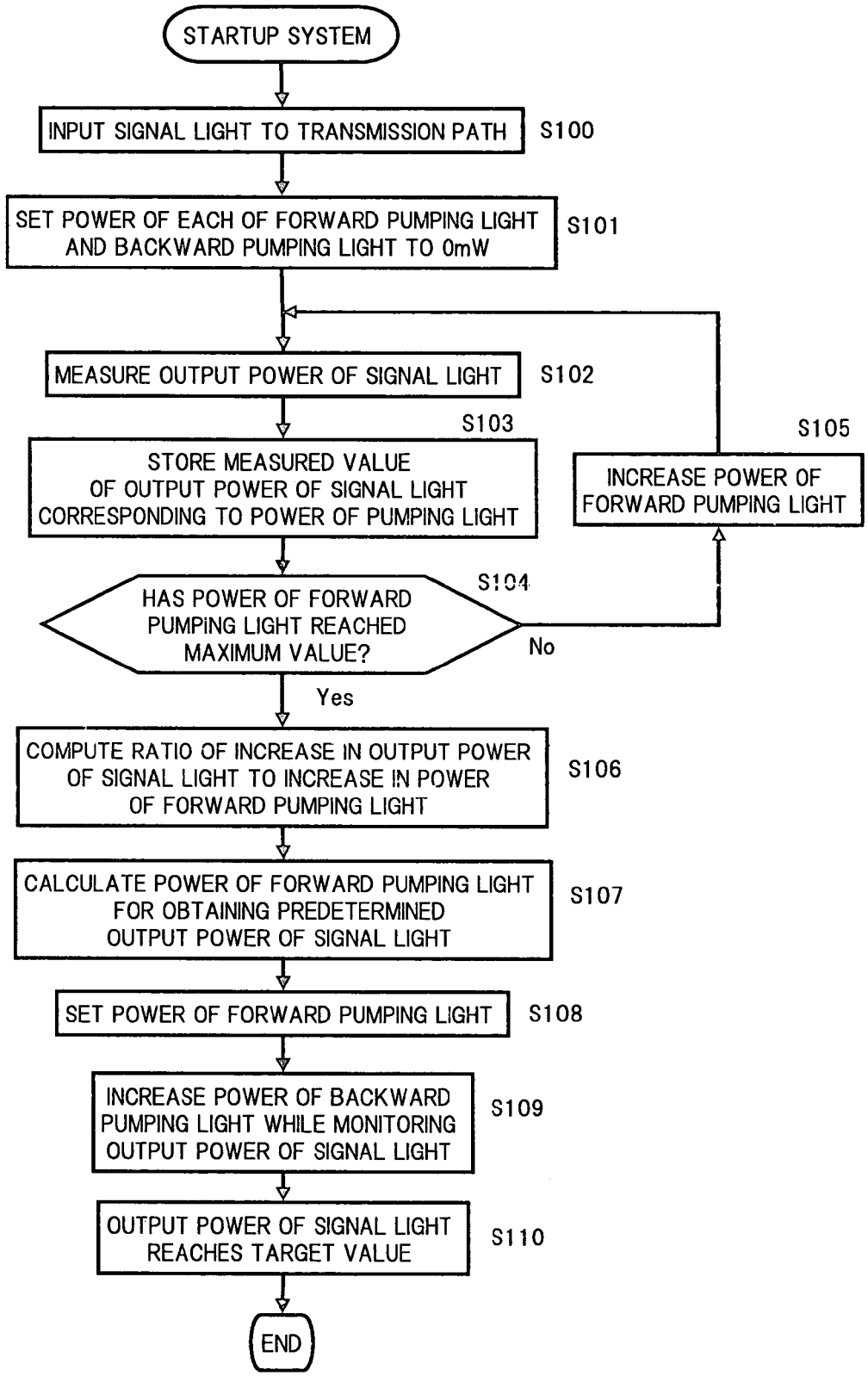
FIG. 9 is a flowchart for explaining a control operation at the startup time in the optical transmission system of FIG. 7.

In the present optical transmission system, at the system startup time, the power of each of the forward pumping light and the backward pumping light supplied to the transmission path fiber 3 in each repeating interval is set in accordance with the algorithm shown in the flow chart in FIG. 9 for example, so that the signal light is transmitted in accordance with the desired level diagram even when the lump loss exists on the transmission path fiber 3.

More specifically, firstly in step 100 in FIG. 9, a signal light equivalent to the WDM signal light transmitted between the transmission and reception terminals during the system operation is input in sequence to the transmission path fiber 3 between each repeating interval from the transmission side. In step 101, operations of the Raman amplification pumping light sources 31 A and 31 B are controlled by the control circuit 36 so that, in the repeating interval wherein the signal light has been input to the transmission path fiber 3, the power of each of the forward pumping light and the backward pumping light supplied to the transmission path fiber 3 becomes 0 mW, that is to say, so that the pumping lights are not supplied to the transmission path fiber 3.

In step 102, the signal light output power propagated through the transmission path fiber 3 to be given to the repeater 4 is measured by the photocoupler 33 and the monitor 34. Then in step 103, the signal light output power value measured by the monitor 34 is stored in a memory or the like (not shown in the figure) in the operation circuit 35, so as to correspond to the pumping light power at that time. When the storage of the measured value of the signal light output power is completed, then in step 104, it is judged whether or not the forward pumping light power has reached a maximum value (power limit) of the pumping light source 31 A. If the forward pumping light power has not reached the maximum value, then in step 105, the drive state of the Raman amplification pumping light source 31 A is controlled by the control circuit 36 so that the forward pumping light power is increased by a required amount (for example, 5 mW), and thereafter, the control returns to step 102 where the signal light output power is measured and stored. The above series of processes is repeated until the forward pumping light power reaches the maximum value, and when the forward pumping light power reaches the maximum value, the control proceeds to the next step 106.

The signal light output power measured by the monitor 34 is the power in which a signal light component and a noise component (spontaneous Raman scattered light) are combined with each other. However, for example, by applying a technique disclosed in Japanese Patent Application No. 2001-553962, being a prior application of the present applicant, it is possible to estimate the spontaneous Raman scattered light power based on the pumping light power, and therefore, by subtracting the spontaneous Raman scattered light power from the measured value of the monitor 34, the output power of only the signal light component can be obtained.

Figure 10:
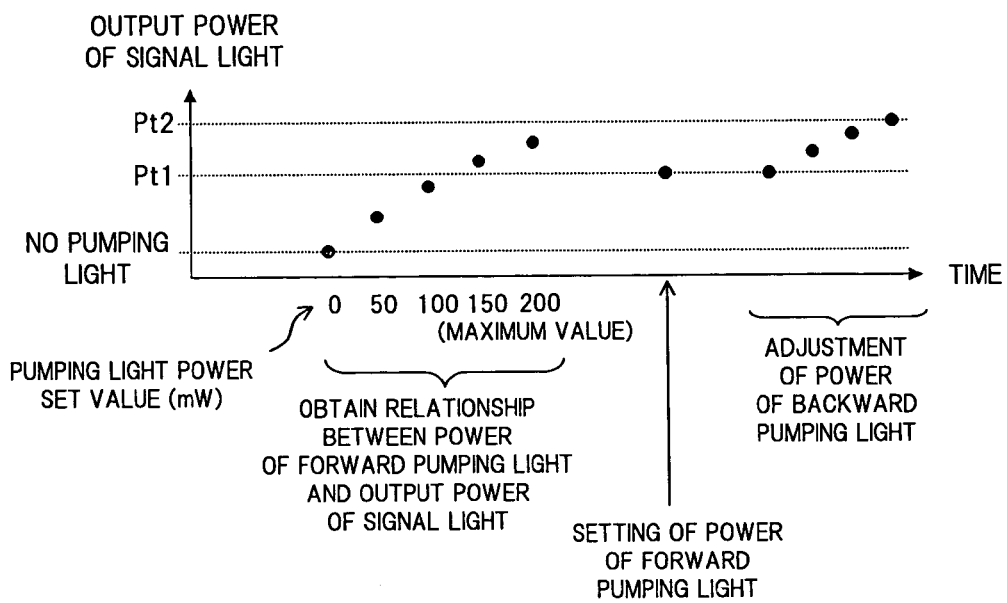
FIG. 10 is a diagram showing a flow of a series of processes at the startup time in the optical transmission system of FIG. 7, with time on the horizontal axis, and signal light output power on the vertical axis.

In step 106, in the operation circuit 35, a ratio of an increase of the signal light output power to an increase of the forward pumping light power is computed using the data stored in the above step 103. A relationship between the forward pumping light power and the signal light output power is obtained based on measurement point data as plotted on the left in FIG. 10 for example, using a well-known approximate expression or the like. FIG. 10 shows a flow of a series of processes at the system startup time, with time on the horizontal axis, and the signal light output power on the vertical axis.

When the relationship between the forward pumping light power and the signal light output power is computed, then in the next step 107, a set value of the forward pumping light output power for realizing a target value Pt1 of the signal light output power (refer to FIG. 10) is computed utilizing the relationship obtained in step 106. This target value Pt1 of the signal light output power is a value previously designing the signal light output power at which a required level diagram can be realized in a condition where only the forward pumping light is supplied to the transmission path fiber 3. When the set value of the forward pumping light power corresponding to the target value Pt1 of the signal light output power is obtained by the operation circuit 35, a signal indicating this set value is sent to the control circuit 36. The drive state of the Raman amplification pumping light source 31 A is controlled by the control circuit 36, in accordance with this signal from the operation circuit 35.

When the forward pumping light power is optimized, then in the next step 109, the backward pumping light power is gradually increased while the signal light output power being monitored by the monitor 34. Then in step 110, the signal light output power reaches a target value Pt2 in the bidirectionally pumping state (refer FIG. 10), to be approximately constant, and thus the control at the system startup time is completed.

Figure 11:
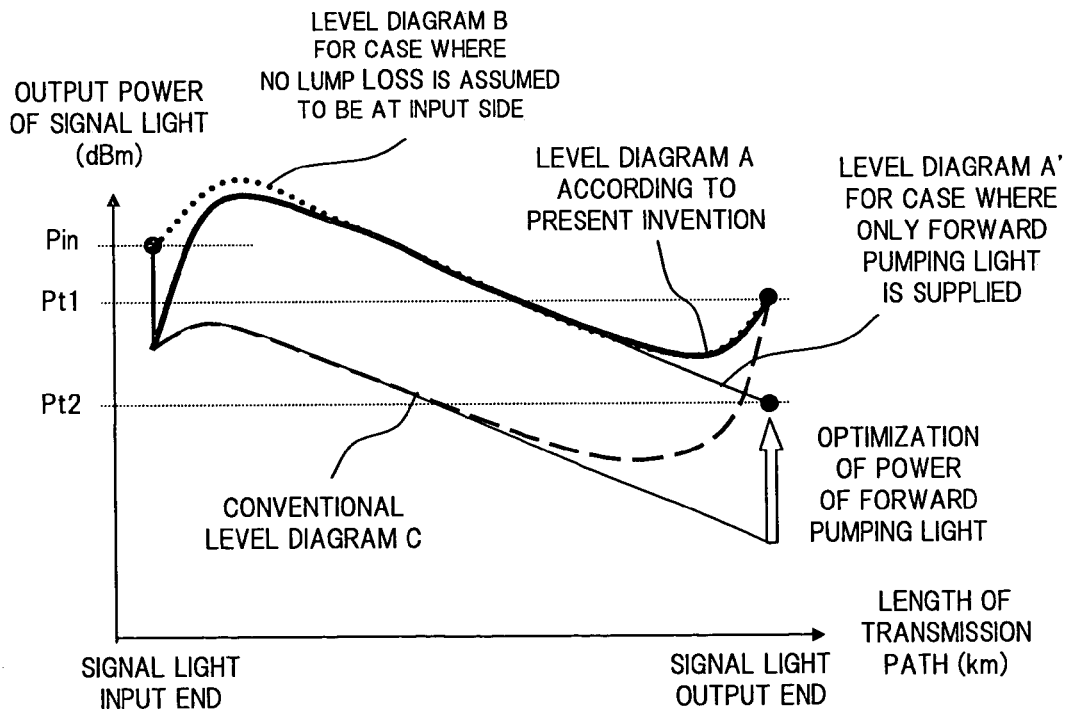
FIG. 11 is a diagram exemplarily showing a signal light level diagram over one repeating interval in the optical transmission system of FIG. 7.

By optimizing the forward pumping light power at the system startup time as described above, then as shown for example in FIG. 11, even when the lump loss exists on the signal light input side on the transmission path fiber, it becomes possible to realize a level diagram approximately equivalent to that for when the lump loss does not exist. That is to say, in the case where the forward pumping light power is set to a predetermined value irrespective of the existence of lump loss as in the conventional case, then as in a level diagram C shown by the dashed line in FIG. 11, if the lump loss exists on the input side, the input level of the signal light to the transmission path fiber 3 is lowered, and at the same time, the forward pumping light power capable to be supplied to the transmission path fiber 3 is also decreased. Therefore, the Raman gain obtained by means of the forward pumping light is decreased, and accordingly, the insufficiency in the gain is supplemented by the backward pumping light. As a result, the minimum level of the signal light on the transmission path fiber 3 is lowered, resulting in the deterioration of the OSNR. On the other hand, in the case of the present system, as in a level diagram A shown by the solid line in FIG. 11, since the signal light output power for when only the forward pumping light is supplied to the transmission path fiber 3 (refer to level diagram A) is raised until it is approximately equal to that in the case where the lump loss does not exist (refer to level diagram B), and thereafter, the Raman gain is obtained by means of the backward pumping light, the minimum level of the signal light is improved, thereby enabling the suppression of the influence by the lump loss. Consequently, it becomes possible to stabilize the performance of the bidirectional pumping type Raman amplifier irrespective of the lump loss on the transmission path fiber.

In the above embodiment, one example has been shown in which the power of the backward pumping light is set so that the output power of the signal light propagated through the transmission path fiber 3 to be amplified by Raman effect is approximately constant at the target value Pt2. However, the present invention is not limited to this, and for example, the power of the backward pumping light may be set so that an on-off gain of the signal light propagated through the transmission path fiber 3 to be amplified by Raman effect is approximately constant at a previously set value.

Next, another embodiment of the optical transmission system applied with the control method of an optical fiber amplifier according to the second aspect of the present invention will be described.

In the above optical transmission system shown in the FIG. 7, the output power of the signal light propagated through the bidirectionally pumped transmission path fiber 3 to be amplified by Raman effect is measured by the monitor 34, and the result is utilized to optimize the power of each of the forward and backward pumping lights. In the present embodiment, there will be described a modified example in which a function as an optical spectrum analyzer is added to the monitor 34, the OSNR is computed based on the result of measurement by the monitor 34, and the power of each of the forward and backward pumping lights is optimized so that the OSNR reaches a desired value. The configuration of the optical transmission system of the present embodiment is the same as that in the above FIG. 7 and FIG. 8. Therefore, here the control operation at the system startup time is described in detail with reference to a flowchart of FIG. 12.

Figure 12:
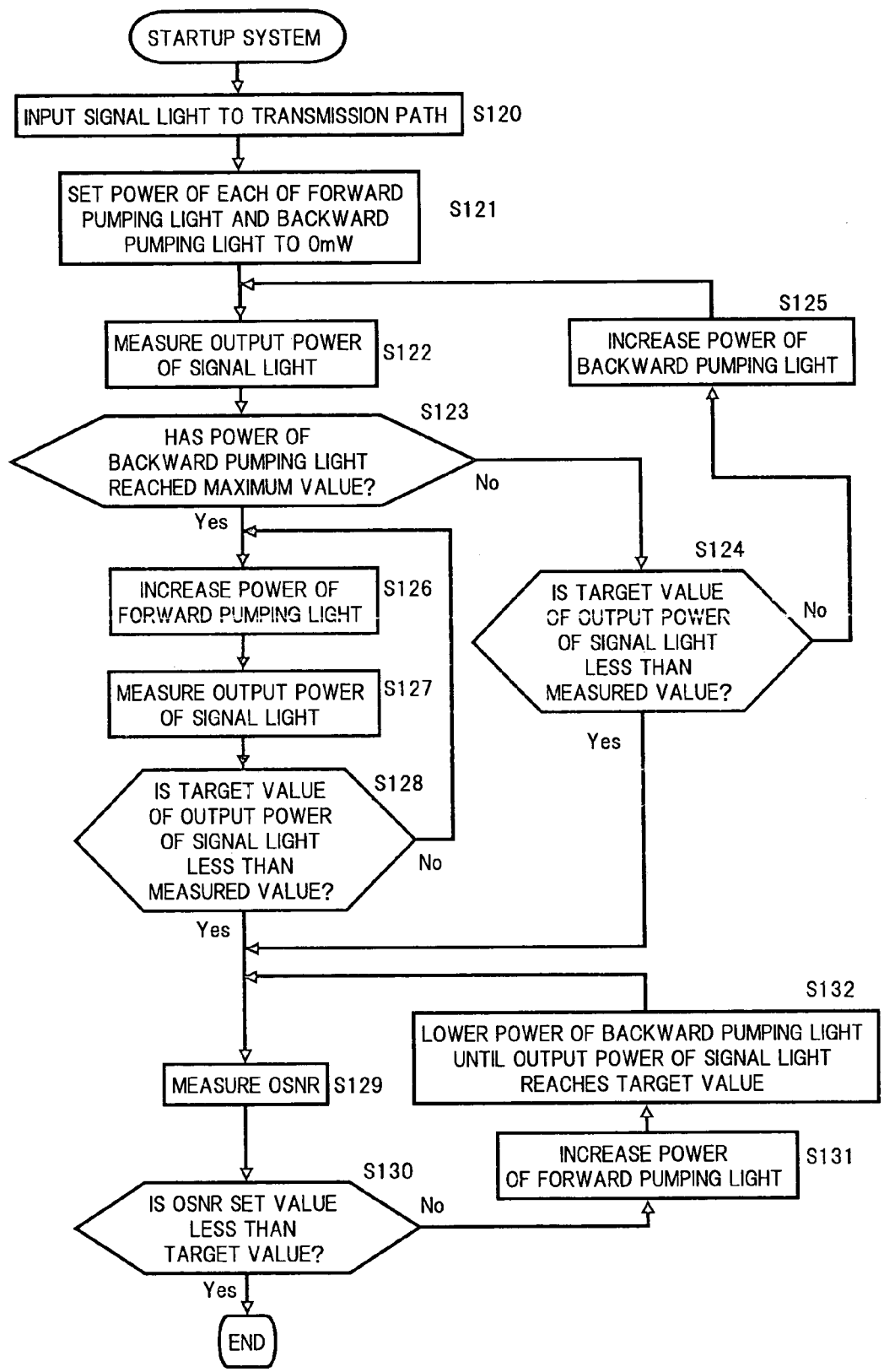
FIG. 12 is a flowchart for explaining a control operation at the startup time in another embodiment of an optical transmission system applied with the control method of an optical fiber amplifier according to the second aspect of the invention.

At the startup time of the present optical transmission system, at first in step 120 in FIG. 12, a signal light equivalent to the WDM signal light transmitted between the transmission terminal and the reception terminal during the system operation is input in sequence to the transmission path fiber 3 in each repeating interval from the transmission side. In step 121, the operations of the Raman amplification pumping light sources 31A and 31B are controlled by the control circuit 36 so that, in the repeating interval wherein the signal light has been input to the transmission path fiber 3, the power of each of the forward pumping light and the backward pumping light supplied to the transmission path fiber 3 becomes 0 mW. In step 122, the signal light output power propagated through the transmission path fiber 3 to be given to the repeater 4 is measured by the photocoupler 33 and the monitor 34. Then in step 123, it is judged whether or not the backward pumping light power has reached a maximum value (power limit) of the pumping light source 31B. If the backward pumping light power has not reached the maximum value, the control proceeds to step 124, while if the backward pumping light power has reached the maximum value, the control proceeds to step 126.

In step 124, it is judged whether or not the value of the signal light output power measured in step 122 has reached the previously set target value Pt2 (refer to FIG. 10) of the signal light output power at the time of bidirectional pumping. If the measured value is the target value Pt2 or less, then in step 125, the drive state of the Raman amplification pumping light source 31A is controlled by the control circuit 36 so that the backward pumping light power is increased by a required amount (for example, 10 mW), and thereafter, the control returns to step 122, where the signal light output power is measured. On the other hand, if the value measured in step 124 is judged to have reached the target value Pt2, the control proceeds to step 129 described below.

In step 126, on receiving the judgment result in step 123 that the backward pumping light power has reached the maximum value, the drive state of the Raman amplification pumping light source 31 B is controlled by the control circuit 36 so that the forward pumping light power is increased by a required amount (for example, 10 mW). In step 127, the output power of the signal light, which has been propagated through the transmission path fiber 3 supplied with the forward and backward pumping lights to be amplified by Raman effect, is measured by the photocoupler 33 and the monitor 34. Then in step 128, as in the above step 124, it is judged whether or not the value of the signal light output power measured in step 127 has reached the target value Pt2. If the measured value is Pt2 or less, the control returns to step 126, where the forward pumping light power is increased, and the signal light output power is again measured. On the other hand, if the measured value has reached the target value Pt2, the control proceeds to the next step 129.

In step 129, the optical spectrum measured by the monitor 34 in the condition where the measured value of the signal light output power exceeds the target value Pt2 is utilized, to obtain the OSNR of the signal light propagated through the transmission path fiber 3 by the operation circuit 35. Then in step 130, it is judged whether the measured value of the OSNR obtained in step 129 is greater than an OSNR value (design value) assumed on the basis of a loss (span loss) in the relevant repeating interval. When the measured value of the OSNR is the design value or less, it is judged that the power of each of the forward and backward pumping lights is to be optimized, and first in step 131, the forward pumping light power is increased by a required amount (for example, 10 mW). Then in step 132, the backward pumping light power is decreased until the signal light output power measured by the monitor 34 is approximately the same as the target value Pt2, and control again returns to step 129, where the OSNR is calculated. Then, it is judged in step 130 that the measured value of the OSNR is greater than the design value, and as a result, the control at the system startup time is completed.

As described above, it becomes also possible to stabilize the performance of the bidirectional pumping type Raman amplifying section, irrespective of the lump loss on the transmission path fiber, by measuring the OSNR of the signal light amplified by Raman effect at the system startup time and optimizing the power of each of the forward and backward pumping lights based on the measurement result.

Figure 13:
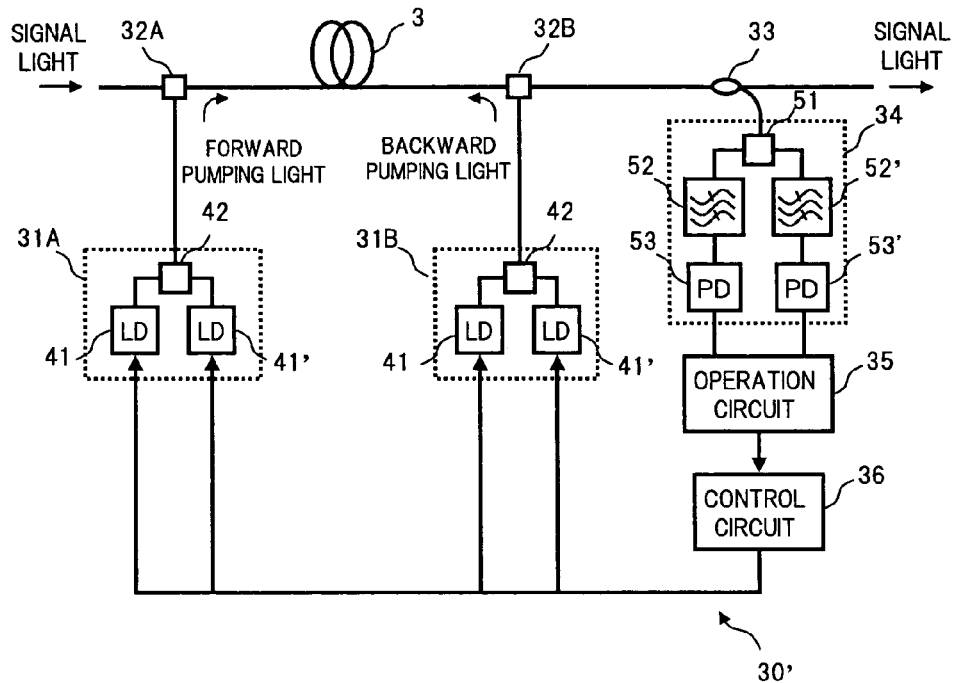
FIG. 13 is a block diagram showing an application example in which the pumping light for Raman amplification is configured by a plurality of wavelengths, related to the optical transmission system of FIG. 7.

In the above described bidirectional pumping type Raman amplifying section 30 shown in FIG. 7, the case has been exemplarily shown in which each of the forward pumping light and backward pumping lights is constituted by a single wavelength. However, it is possible to apply the present invention to a bidirectional pumping type Raman amplifying section in which the forward pumping light or the backward pumping light is constituted by a plurality of wavelengths. For example, as shown in FIG. 13, each of the forward and backward Raman amplification pumping light sources 31A and 31B may comprise two pumping light sources 41 and 41' having wavelengths different from each other, and a WDM coupler 42 which multiplexes pumping lights output from the pumping light sources 41 and 41'. Further, in this case, the configuration of the monitor 34 may be such that the signal light branched by the photocoupler 33 is further branched into two by a photocoupler 51, and the two branched lights pass through two optical filters 52 and 52' each having a transmission band corresponding to the peak wavelength of the Raman gain by means of the pumping light of each wavelength, to be received by light receiving elements 53 and 53', and the monitoring of the signal lights may be individually performed corresponding to the respective pumping light wavelength, to control the pumping light power of the corresponding wavelength based on each monitoring result. According to such a configuration, it becomes possible to optimize the power of each of the forward and backward pumping lights with higher accuracy. For the above specific algorithm for controlling the pumping light power having the plurality of wavelengths, for example the technique disclosed in Japanese Unexamined Patent Publication No. 2002-72262 or the like can be applied.

Figure 14:
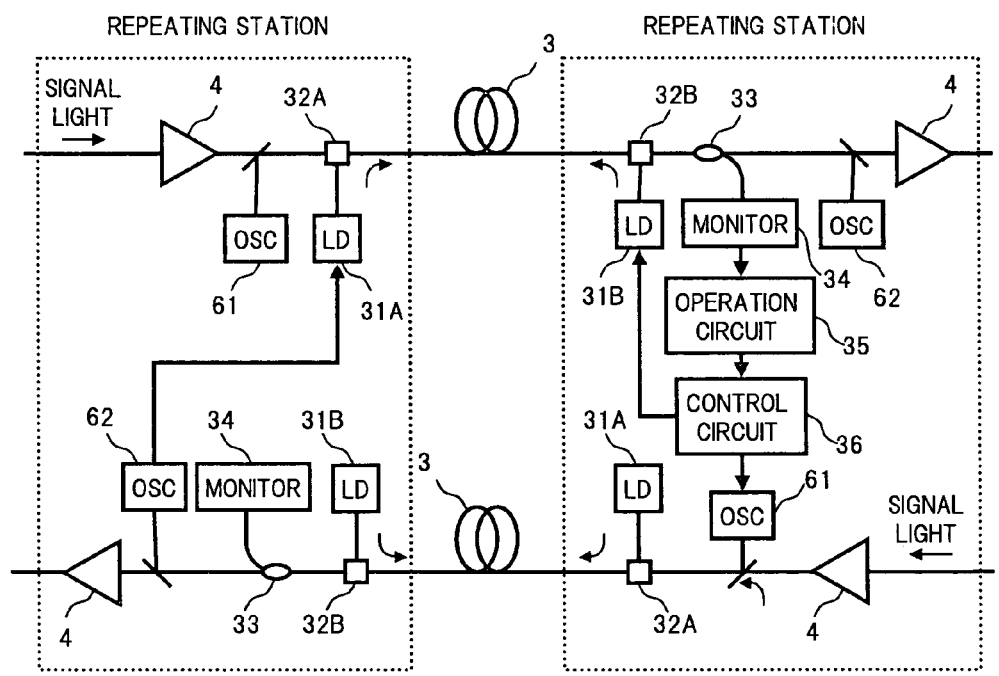
FIG. 14 is a block diagram showing an application example in which supervisory control signals of opposing circuits are utilized to transmit control signals related to the optical transmission system of FIG. 7.

Moreover, in the above configuration of the optical transmission system shown in the FIG. 7, it is possible to utilize a supervisory control signal (OSC) transmitted on opposing circuits as shown in FIG. 14 for example, as specific means for transmitting the control signal generated by the control circuit 36 arranged on the reception side of a single repeating interval, to the Raman amplification pumping light source 31A arranged on the transmission side. In the configuration example shown in FIG. 14, the control signal for controlling the forward pumping light power on the uplink shown at the top of the figure, is transmitted from the control circuit 36 to an OSC transmitter 71 on the downlink side in the same repeating station. Then, the control signal on the uplink side is sent while being carried on the supervisory control signal being propagated through the downlink, and the control signal received by the OSC receiver 72 is sent to the Raman amplification pumping light source 31A on the uplink side in the same repeating station. The example in FIG. 14 shows only the configuration for transmitting the control signal on the uplink side, however the control signal on the downlink side may be transmitted with a similar configuration as for the uplink side.

What is claimed is:

1. A method of controlling an optical fiber amplifier which pumps light into a rare-earth element doped optical fiber, and amplifies the light propagating through said rare-earth element doped optical fiber, comprising;
   adjusting power of the light pumped into said rare-earth element doped optical fiber; and
   controlling a transmission wavelength characteristic of a dynamic gain equalizer which equalizes a wavelength deviation of an output power of the light propagated and amplified through said rare-earth element doped optical fiber, according to a change in a gain wavelength characteristic occurring due to the adjusting of the power of said pumping light, to thereby extend a light wavelength band, of the light amplified by said rare-earth element doped optical fiber, to either a short wavelength side or a long wavelength side.

2. The method of controlling an optical fiber amplifier according to claim 1, wherein, when said rare-earth element doped optical fiber is an erbium doped optical fiber, the power of the light pumped into said erbium doped optical fiber is decreased to less than a previously set reference power, and the transmission wavelength characteristic of said dynamic gain equalizer is controlled according to a decreased amount of said power of the light pumped into said erbium doped optical fiber, to thereby extend the light wavelength band, of the light amplified by said erbium doped optical fiber, to the long wavelength side.

3. The method of controlling an optical fiber amplifier according to claim 1, wherein, when said rare-earth element doped optical fiber is an erbium doped optical fiber, the power of the light pumped into said erbium doped optical fiber is increased to exceed a predetermined reference power, and the transmission wavelength characteristic of said dynamic gain equalizer is controlled according to an increased amount of said pumping light power of the light dumped into said erbium doped optical fiber, to thereby extend the light wavelength band of the light, amplified by said erbium doped optical fiber, to the short wavelength side.

4. The method of controlling an optical fiber amplifier according to claim 1, wherein
   the light is pumped into a transmission path fiber connected to a signal light input side of said rare-earth element doped optical fiber, to thereby amplify the light propagated through said transmission path fiber by Raman effect, and
   a wavelength of the light pumped into said transmission path fiber is increased corresponding to an extension of the light wavelength band which is amplified by said rare-earth element doped optical fiber.

5. The method of controlling an optical fiber amplifier according to claim 4, wherein the light having a plurality of different wavelengths is pumped into said transmission path fiber to amplify the light by Raman effect, and power corresponding to at least one wavelength of said plurality of wavelengths pumped into said transmission path fiber is adjusted corresponding to an extension of the light wavelength band of the light which is amplified by said rare-earth element doped optical fiber.

6. The method of controlling an optical fiber amplifier according to claim 4, a decreased amount of a gain, which occurred due to the adjusting of the power of the light pumped into said rare-earth element doped optical fiber, is compensated by increasing a power of a Raman amplification of the light pumped into said transmission path fiber.

7. An optical transmission system including an optical fiber amplifier which pumps light into a rare-earth element doped optical fiber, and amplifies the light propagating through said rare-earth element doped optical fiber, comprising:
   a dynamic gain equalizer which equalizes a wavelength deviation on an output power of the light propagated through said rare-earth element doped optical fiber to be amplified; and
   a control circuit which adjusts a power of the light pumped into said rare-earth element doped optical fiber, and also-controls a transmission wavelength characteristic of said dynamic gain equalizer according to a change in a gain wavelength characteristic occurring due to a power adjustment of said light, to thereby extend a light wavelength band of the light which is amplified by said rare-earth element doped optical fiber, to either a short wavelength side or a long wavelength side.

8. The optical transmission system according to claim 7, wherein
   said rare-earth element doped optical fiber is an erbium doped optical fiber, and
   said control circuit decreases the power of the light pumped into said erbium doped optical fiber to less than a previously set reference power, and controls the transmission wavelength characteristic of said dynamic gain equalizer according to a decreased amount of power of said light pumped into said erbium doped optical fiber, to thereby extend the light wavelength band of the light which is amplified by said erbium doped optical fiber to the long wavelength side.

9. The optical transmission system according to claim 7, wherein
   said rare-earth element doped optical fiber is an erbium doped optical fiber, and
   said control circuit increases the power of the light pumped into said erbium doped optical fiber to exceed a previously set reference power, and controls the transmission wavelength characteristic of said dynamic gain equalizer according to an increased amount of power of said light, to thereby extend the light wavelength band of the light which is amplified by said erbium doped optical fiber, to the short wavelength side.

10. The optical transmission system according to claim 7, further comprising:

a transmission path fiber connected to a light input side of said rare-earth element doped optical fiber; and a Raman amplifier which amplifies the light propagated through said transmission path fiber by Raman effect, wherein said control circuit controls a pumping light source of said Raman amplifier corresponding to the extension of the signal light band of the light which is amplified by said rare-earth element doped optical fiber, and increases a wavelength of the light pumped into said transmission path fiber.

11. The optical transmission system according to claim 10, wherein said Raman amplifier includes a plurality of pumping light sources which light sources pump light having a plurality of different wavelengths into said transmission path fiber, and said control circuit controls at least one of said plurality of pumping light sources corresponding to the extension of the light wavelength band of the light which is amplified by said rare-earth element doped optical fiber, and adjusts the power of the light pumped into said transmission path fiber from the at least one of the pumping light sources.

12. The optical transmission system according to claim 10, wherein said control circuit compensates for a decreased amount of a gain, which occurred due to a power adjustment of the pumped into said rare-earth element doped optical fiber, by increasing power of the light pumped into said transmission path fiber by the Raman amplifier.

* * * * *

UNITED STATES PATENT AND TRADEMARK OFFICE
CERTIFICATE OF CORRECTION

PATENT NO. : 7,145,718 B2  
APPLICATION NO. : 10/929539  
DATED : December 5, 2006  
INVENTOR(S) : Yasushi Sugaya et al.

It is certified that error appears in the above-identified patent and that said Letters Patent is hereby corrected as shown below:

Column 19, Line 43, change "band," to --band--.

Column 19, Line 55, change "band," to --band--.

Column 19, Line 64, after "amount of" delete "said pumping light".

Column 19, Line 65, change "dumped" to --pumped--.

Column 19, Line 66, change "light," to --light--.

Column 20, Line 39, change "also-controls" to --controls--.

Column 22, Line 11, after "adjusts" delete "the".

Column 22, Line 17, after "of the" insert --light--.

Signed and Sealed this

Twenty-seventh Day of March, 2007

JON W. DUDAS  
*Director of the United States Patent and Trademark Office*